United States Patent
Seth et al.

(10) Patent No.: US 11,962,507 B1
(45) Date of Patent: *Apr. 16, 2024

(54) ESTIMATING STANDBY SOCKET WINDOW SIZE DURING ASYNCHRONOUS SOCKET REPLICATION

(71) Applicant: Juniper Networks, Inc., Sunnyvale, CA (US)

(72) Inventors: Sameer Seth, Bangalore (IN); Ananda Kumar M R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,330

(22) Filed: Jan. 30, 2023

Related U.S. Application Data (63) Continuation of application No. 17/249,725, filed on Mar. 10, 2021, now Pat. No. 11,570,116.

(51) Int. Cl.
*H04L 47/27* (2022.01)
*H04L 41/0668* (2022.01)

(52) U.S. Cl.
CPC .......... *H04L 47/27* (2013.01); *H04L 41/0668* (2013.01)

(58) Field of Classification Search
CPC .......................... H04L 47/27; H04L 41/0668
See application file for complete search history.

(56) References Cited

U.S. PATENT DOCUMENTS

| | | | |
|---|---|---|---|
| 6,665,293 B2 | 12/2003 | Thornton et al. | |
| 6,853,617 B2 | 2/2005 | Watson et al. | |
| 7,236,453 B2 | 6/2007 | Visser et al. | |
| 7,269,133 B2 | 9/2007 | Lu et al. | |
| 7,274,706 B1 | 9/2007 | Nguyen et al. | |
| 7,292,535 B2 | 11/2007 | Folkes et al. | |

(Continued)

FOREIGN PATENT DOCUMENTS

| | | |
|---|---|---|
| CN | 102572994 A | 7/2012 |
| CN | 103210669 A | 7/2013 |

(Continued)

OTHER PUBLICATIONS

Furong, "The Communication of Process Based on Stream Socket of Winsock", Journal of Xi an University of Arts & Science, vol. 13, No. 2, Apr. 2010, pp. 81-84.

(Continued)

*Primary Examiner* — Abdulkader M Alriyashi
(74) *Attorney, Agent, or Firm* — Shumaker & Sieffert, P.A.

(57) ABSTRACT

A secondary routing device is configured as a backup routing device for a primary routing device. The primary routing device performs asynchronous socket replication with the secondary routing device. The secondary routing device includes a transmission buffer, in memory, for storing replicated socket data transmitted between the primary routing device and the standby routing device and one or more processors implemented in circuitry and configured to execute a replication driver to: determine a threshold value; determine that an amount of data equaling or exceeding the threshold value has been read from the transmission buffer; in response to determining that the amount of data equaling or exceeding the threshold value has been read from the transmission buffer, schedule a window update for the transmission buffer at a scheduled time; and send the window update at the scheduled time.

7 Claims, 7 Drawing Sheets

(56) References Cited

U.S. PATENT DOCUMENTS

| | | |
|---|---|---|
| 7,417,947 B1 | 8/2008 | Marques et al. |
| 7,499,394 B2 | 3/2009 | Visser et al. |
| 7,751,311 B2 | 7/2010 | Ramaiah et al. |
| 7,940,650 B1 | 5/2011 | Sandhir et al. |
| 8,050,559 B2 | 11/2011 | Sindhu |
| 8,837,479 B1 | 9/2014 | Kumar |
| 8,934,486 B2 | 1/2015 | Wijnands |
| 9,077,617 B1 | 7/2015 | Seth |
| 9,198,203 B2 | 11/2015 | Shaffer et al. |
| 9,491,107 B1 | 11/2016 | Scudder et al. |
| 9,628,409 B1 | 4/2017 | Yuvaraj et al. |
| 10,033,539 B1 | 7/2018 | Nagarajan et al. |
| 10,291,750 B1 | 5/2019 | Seth et al. |
| 11,115,262 B2 | 9/2021 | Dubey et al. |
| 11,323,309 B1 | 5/2022 | Seth et al. |
| 11,570,116 B1 | 1/2023 | Seth et al. |
| 2002/0167952 A1 | 11/2002 | Watson et al. |
| 2003/0210694 A1 | 11/2003 | Jayaraman et al. |
| 2006/0198296 A1 | 9/2006 | Majee et al. |
| 2007/0217415 A1 | 9/2007 | Wijnands |
| 2008/0044181 A1 | 2/2008 | Sindhu |
| 2008/0072236 A1 | 3/2008 | Pope et al. |
| 2008/0088408 A1 | 4/2008 | Backman |
| 2008/0291906 A1 | 11/2008 | Chigurupati et al. |
| 2009/0228970 A1 | 9/2009 | Morimoto |
| 2009/0268747 A1 | 10/2009 | Kurata et al. |
| 2010/0177752 A1 | 7/2010 | Aggarwal et al. |
| 2013/0094505 A1 | 4/2013 | Sarikaya |
| 2013/0148657 A1 | 6/2013 | Salam |
| 2014/0226531 A1 | 8/2014 | Farkas et al. |
| 2015/0006757 A1 | 1/2015 | Boutros |
| 2015/0288540 A1 | 10/2015 | Kotalwar |
| 2016/0119156 A1 | 4/2016 | Drake |
| 2016/0134525 A1 | 5/2016 | Zhang |
| 2016/0277210 A1 | 9/2016 | Lin |
| 2017/0070444 A1 | 3/2017 | Dhanabalan et al. |
| 2017/0093611 A1 | 3/2017 | Arora |
| 2017/0195210 A1 | 7/2017 | Jacob |
| 2017/0257311 A1 | 9/2017 | Sharma |
| 2022/0263706 A1 | 8/2022 | Seth et al. |

FOREIGN PATENT DOCUMENTS

| | | |
|---|---|---|
| CN | 103532841 A | 1/2014 |
| CN | 108462637 A | 8/2018 |
| CN | 110958176 A | 4/2020 |
| EP | 3188409 A1 | 7/2017 |
| EP | 3188415 A1 | 7/2017 |

OTHER PUBLICATIONS

Corrected Notice of Allowance from U.S. Appl. No. 17/661,698 dated May 4, 2023, 3 pp.

Cain et al., "Internet Group Management Protocol, Version 3," RFC 3376, Network Working Group, Oct. 2002, 53 pp.

Fenner, "Internet Group Management Protocol, Version 2," RFC 2236, Network Working Group, Nov. 1997, 24 pp.

Holbrook et al., "Using Internet Group Management Protocol Version 3 (IGMPv3) and Multicast Listener Discovery Protocol Version 2 (MLDv2) for Source-Specific Multicast," RFC 4604, Network Working Group, Aug. 2006, 11 pp.

Notice of Allowance from U.S. Appl. No. 17/248,216, dated Mar. 2, 2022, 9 pp.

Prosecution History from U.S. Appl. No. 17/249,725, now issued U.S. Pat. No. 11,570,116, dated Mar. 31, 2022 through Oct. 27, 2022, 20 pp.

Prosecution History from U.S. Appl. No. 17/661,698, dated Jul. 14, 2022 through Feb. 7, 2023, 41 pp.

Sajassi et al., "BGP MPLS Based Ethernet VPN," Network Working Group Internet Draft, draft-ietf-l2vpn-evpn-11, Oct. 18, 2014, 52 pp.

Sajassi et al., "BGP MPLS-Based Ethernet VPN," RFC 7432, Internet Engineering Task Force (IETF), Feb. 2015, 56 pp.

U.S. Appl. No. 15/806,625, filed Nov. 8, 2017, naming inventors Seth et al.

ESTIMATING STANDBY SOCKET WINDOW SIZE DURING ASYNCHRONOUS SOCKET REPLICATION

RELATED APPLICATION

This application is a continuation of U.S. application Ser. No. 17/249,725, filed Mar. 10, 2021, the entire contents of which are incorporated herein by reference.

TECHNICAL FIELD

This disclosure relates to computer networks and, more particularly, to network devices, such as routers, that perform a switchover from a primary control unit to a secondary control unit.

BACKGROUND

A computer network is a collection of interconnected computing devices that can exchange data and share resources. Certain devices within the computer network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility of forwarding packet flows. During a switchover from the primary routing control unit to the secondary routing control unit, a significant period of time may elapse before the secondary routing control unit reaches a state in which it is able to process and forward packets. For example, the secondary routing control unit may need to reestablish routing sessions, e.g., BGP sessions, that were lost when the primary routing control unit failed. During this period, network traffic may be queued or lost.

SUMMARY

In general, this disclosure describes techniques for enabling non-stop routing and graceful switchover between a primary routing device (e.g., a primary routing control unit of a router) and a backup routing device (e.g., a backup routing control unit), e.g., to provide high availability. The backup routing device may also be referred to as a "standby routing device" or a "secondary routing device." The primary routing device and backup routing device may operate within the same network node, i.e., within the same router. In other examples, the primary routing device and the backup routing device are separate physical devices (i.e., having separate chassis) but may be configured to operate as HA device to provide a single, logical routing node within a network.

To maintain high availability, socket replication is performed between the primary and backup routing devices. The primary routing device and the backup routing device may be configured to use asynchronous socket replication. In asynchronous socket replication, the primary routing device does not wait for the backup routing device to update a backup socket to reflect a current state of a primary socket of the primary routing device before sending data via the primary socket. Instead, the primary routing device simply waits for an acknowledgement that the backup routing device has received the replicated data (e.g., a Transmission Control Protocol (TPC) acknowledgement (ACK)). Such asynchronous socket replication can reduce delay in sending data via the primary socket.

In some cases, a buffer on the backup routing device for exchanging data between the primary routing device and the backup routing device may become too full. Accordingly, the primary routing device may be configured with techniques of this disclosure to determine an amount of buffer usage by the backup routing device and to throttle replicated data to the backup routing device when the amount of buffer usage by the backup routing device exceeds a threshold. Furthermore, the backup routing device may be configured, according to techniques of this disclosure, to send window updates to the primary network device after a replication application executed by the backup routing device consumes more than a threshold amount of data from the buffer. Additionally, the backup routing device may be configured with a timer, such that when the timer expires, the backup routing device schedules a window update to the primary network device. In this manner, the backup routing device can schedule the window update either using expiration of the timer or when a certain amount of data has been read from the buffer. Thus, these techniques may reduce delay in sending the window update to the primary routing device (e.g., earlier than the timer when the backup routing device consumes more than the threshold amount of data from the buffer).

In one example, a method includes determining, by a standby driver executed by a processor implemented in circuitry of a standby routing device, a threshold value, the standby routing device acting as a backup routing device for a primary routing device; determining, by the standby driver, that an amount of data equaling or exceeding the threshold value has been read from a transmission buffer of the standby routing device, the transmission buffer storing replicated socket data transmitted between the primary routing device and the standby routing device; in response to determining that the amount of data equaling or exceeding the threshold value has been read from the transmission buffer, scheduling, by the standby driver, a window update for the transmission buffer at a scheduled time; and sending, by the standby driver, the window update at the scheduled time.

In another example, a secondary routing device is configured as a backup routing device for a primary routing device. The secondary routing device includes a memory configured to include a transmission buffer, the transmission buffer storing replicated socket data transmitted between the primary routing device and the standby routing device; and one or more processors implemented in circuitry and configured to execute a replication driver to: determine a threshold value; determine that an amount of data equaling or exceeding the threshold value has been read from the transmission buffer; in response to determining that the amount of data equaling or exceeding the threshold value has been read from the transmission buffer, schedule a window update for the transmission buffer at a scheduled time; and send the window update at the scheduled time.

In another example, a computer-readable storage medium has stored thereon instructions that, when executed, cause a processor of a secondary routing device, configured as a backup routing device to a primary routing device, to execute a replication driver to: determine a threshold value; determine that an amount of data equaling or exceeding the threshold value has been read from a transmission buffer of the secondary routing device, the transmission buffer storing replicated socket data transmitted between the primary routing device and the standby routing device; in response to determining that the amount of data equaling or exceeding the threshold value has been read from the transmission buffer, schedule a window update for the transmission buffer at a scheduled time; and send the window update at the scheduled time.

The details of one or more examples are set forth in the accompanying drawings and the description below. Other features, objects, and advantages will be apparent from the description and drawings, and from the claims.

DETAILED DESCRIPTION

Figure 1:
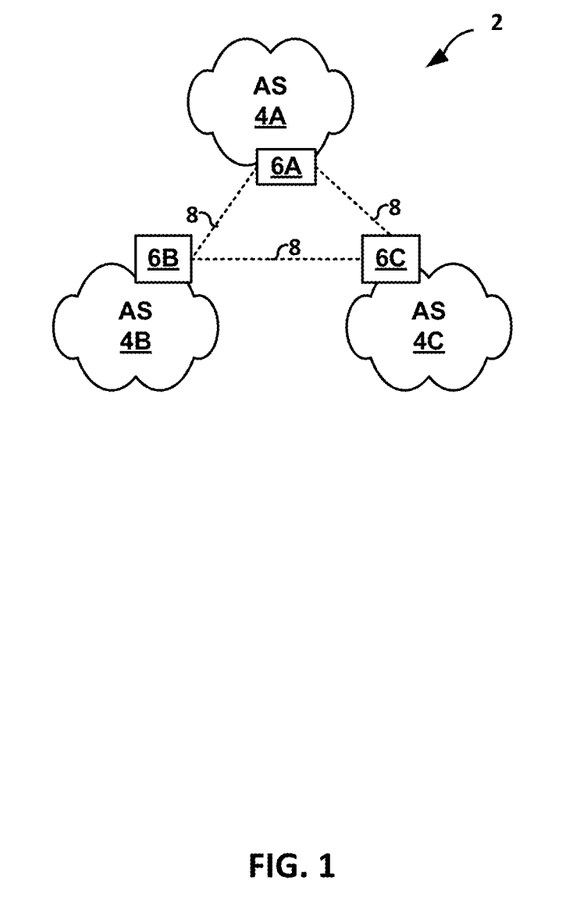
FIG. 1 illustrates an example computing network formed by autonomous systems interconnected by communication links.

FIG. 1 illustrates an example computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include autonomous system border routers (ASBRs) 6 for sharing routing information and forwarding packets via communication links 8. That is, routers 6 maintain peer routing sessions and exchange messages conveying routing information in accordance with a routing protocol, such as the Border Gateway Protocol (BGP). The messages communicated over the routing sessions typically advertise and withdraw routes for reaching destinations within network 2. In the event of a network topology change, such as link failure or failure of one of routers 6, any of the routers detecting the change issue routing messages (e.g., route advertisements) informing the other routers of the affected routes. In response, routers 6 select new routes for reaching the destinations within network 2.

In order to mitigate the effects on node failure, one or more of routers 6 (e.g., router 6A) may incorporate a primary routing engine and one or more secondary routing engines to assume routing responsibilities in the event the primary routing engine fails. The primary routing engine and the secondary routing engine may be included within the same physical device or in separate devices. Moreover, as described herein, one or more of routers 6 provide non-stop routing after graceful switchover from the primary routing engine to one of the secondary routing engines using replication of routing sessions. That is, data for sockets associated with the routing sessions on the primary routing engine is transparently replicated to the secondary routing engine in real-time (i.e., while the primary routing engine exchanges routing messages) prior to any switchover event. The secondary routing engine constructs and maintains backup sockets so as to mimic the (connected) sockets currently used by the primary routing engine when communicating with the other routers 6.

During a switchover from the primary routing engine to the secondary routing engine, the pre-established (e.g., pre-connected) backup sockets on the secondary routing engine contain all the information needed to preserve the connections with the routing peers. These sockets enable the routing communications sessions to continue uninterrupted such that these connections need not be reestablished. This information may include any outbound/inbound data queued in the connected socket buffer and information describing a state (e.g., a transport layer state) of that socket. The state of the connected socket at the primary routing engine identifies which outbound data blocks (e.g., bytes) have been written to the connected socket and then replicated to the backup socket and communicated to a peer network device but have not been acknowledged by that peer network device (i.e., unacknowledged data blocks).

Based on the unacknowledged data block(s), the state of the connected socket identifies which data blocks are next to be sent to the peer network device (i.e., "send next" data blocks). When (due to the switchover) the secondary routing engine assume control over the routing sessions from the primary routing engine, the secondary routing engine (in accordance with the state of the connected socket) communicates one or more send next data blocks in continuance of the routing sessions without lagging behind the primary routing engine. Because the secondary routing engine maintains an up-to-date state of the connected socket, the secondary routing engine avoids communicating data that the primary routing already transmitted prior to the switchover. The secondary routing engine may begin transmitting data where the primary routing engine left off with respect to transmitting data for the routing sessions. Hence, the switchover to the secondary routing engine is seamless and, to the peer network device, there is not a substantial delay between the primary routing engine's last transmission and the secondary routing engine's first transmission.

As described herein, these techniques provide non-stop routing from multiple network devices in a network or a single network device in that network and enable a graceful switchover that seamlessly transfers control over a routing session from the primary routing engine to the secondary routing engine. As further described herein, these techniques facilitate asynchronous socket replication by replicating data via a first transport layer connection (e.g., a replication socket) between the primary routing engine and the secondary routing engine. The techniques further include automatically pushing data onto a protocol stack—which prepares and schedules the data for communication to the peer network device via a second transport layer connection (e.g., the connected socket)—as a response to receiving a socket acknowledgment. In asynchronous socket replication, the socket acknowledgement may be a TCP acknowledgement (ACK) of the replicated data. Additional details regarding asynchronous socket replication are described in U.S. patent application Ser. No. 17/248,216, filed Jan. 14, 2021, which is incorporated by reference herein in its entirety.

Conventional socket replication techniques are limited to synchronous socket replication, and require that the primary routing engine halt the communication to the peer network device and wait for an explicit acknowledgement message from the secondary routing engine before pushing any replicated data onto the protocol stack. Waiting for the explicit acknowledgement may result in significant latencies in the routing sessions. Synchronous replication of a socket requires maintenance of data/state in either direction until the primary routing engine receives an explicit acknowledgement message from the secondary routing engine that the data/state has been successfully replicated. The acknowledgement from the secondary routing engine contains information about the socket send/receive window that the primary routing engine will make note of. This conventional replication mechanism will introduce a delay factor associated with each replication data-block.

By contrast, TCP level acknowledgment, as used in asynchronous socket replication and discussed above, ensures delivery of data to the secondary routing engine. With the asynchronous socket replication mechanism, the primary routing engine must ensure appropriate estimates of the send/receive windows of buffers of the secondary routing engine at any time. Overestimation of the send/receive buffer will unnecessarily cause drop of data packets, and hence, a drop in performance.

The asynchronous socket replication mechanism may prevent introduction of delays when replicating data blocks. A correct estimation of the send/receive buffers on the secondary routing engine by the primary routing engine allows the primary routing engine to decide a rate at which data can be pushed to the secondary routing engine without introducing delays. Thus, the secondary routing engine may use a timer-based window update mechanism for each asynchronous replicated socket on the secondary routing engine. The secondary routing engine may schedule the timer only if there is data to be consumed in the replicated socket buffers. Every time the secondary routing engine reads data from the socket buffers, space for more data to be received is created in the buffers. The secondary routing engine may determine a threshold (e.g., twice a maximum segment size (MSS)). When the secondary routing engine reads an amount of data from any of the send/receive buffers equal to or greater than the threshold, the secondary routing engine may immediately schedule a window update for the replicated socket, rather than waiting for the timer to expire. Thus, if data is consumed slowly, the timer may trigger the window update, whereas if the secondary routing engine consumes the data quickly, the threshold data consumption mechanism may trigger the window update.

As described herein, some techniques may be implemented without requiring changes to networking protocols. In this manner, the techniques provide for asynchronous and peer-agnostic socket replication.

It should be noted that the present disclosure may refer to an example secondary routing engine as a backup or standby node and an example primary routing engine as a primary or primary node within a network. Depending on context regarding the network, a node may refer to a routing engine that shares a network device with another routing engine or a network device that operates as a single routing engine.

For purposes of example, the techniques of this disclosure are described with reference to router 6A and, in some instances, router 6B. However, router 6C may operate in accordance with the techniques described herein. In this example, router 6A and/or router 6B provides non-stop routing by including a primary routing engine as well as one or more standby routing engines. As described herein, router 6A may be a network device that includes both the primary and secondary routing engines, or router 6A and router 6B may represent the primary and secondary routing engines, respectively, as part of separate network devices. In the event of a graceful switchover, i.e., when the primary routing engine of router 6A fails or otherwise needs to be shut down, one of the secondary routing engines assumes control over routing resources and routing functionality generally. Prior to the switchover, the primary and secondary routing engines synchronize information corresponding to their respective states to allow the secondary routing engine to assume control of the routing resources without having to relearn state information. Moreover, a corresponding socket is pre-established on the secondary routing engine for each socket currently in use by the primary routing engine for routing sessions.

For example, router 6A may engage in a routing session with, e.g., router 6C using a socket (e.g., a connected socket). Router 6A and router 6C, a peer network device, may exchange session messages over the connected socket in accordance with a routing protocol, such as BGP. When router 6A receives a message from router 6C, the message may be internally forwarded to the primary routing engine of router 6A for processing. At some point between reception and acknowledgment, a replication module (on behalf of the primary routing engine) is configured to replicate the received message and then, send to the secondary routing engine of router 6A via a replication socket. In some examples, the replication module in the primary routing engine generates a data unit in accordance with a transport protocol of the second socket, such as TCP and then, communicates that data unit with the received message (e.g., in its payload). With respect to outbound messages, when router 6A generates a message for communication to router 6C via the connected socket, the replication module of the primary routing engine is configured to replicate the message to be sent and then, send that replicated message to the secondary routing engine via the replication socket. In some examples, router 6A generates a composite message configured to store (e.g., in its payload) the replicated message with state information corresponding to the connected socket.

Similarly, router 6B may engage in a routing session with, e.g., router 6C using a second connected socket in accordance with a transport protocol. With respect to inbound routing messages, when router 6B receives a message from router 6C, the message may be internally forwarded to the primary routing engine of router 6B for processing. At some point between reception and acknowledgment, a replication module (on behalf of the primary routing engine at router 6B) replicates the received message and then, sends that replicated message to the secondary routing engine running in router 6A via the second replication socket. When router 6B generates a message for communication to router 6C via the socket, the replication module replicates the message to be sent and then, sends that message to the secondary routing engine via the second replication socket.

In response to receiving inbound or outbound messages via the replication socket or the second replication socket, a backup or standby replication module in the secondary routing engine updates state information (e.g., TCP state information) for a backup socket that provides network communication connectivity to router 6C. The backup socket corresponds to the connected socket of the primary routing engine at router 6A or the second connected socket of the primary routing engine at router 6B. In either example, once the secondary routing engine configures the backup socket, a signal (e.g., a keepalive signal) may be automatically enabled with the primary routing engine in either router 6A or the primary routing engine in router 6B. For the backup socket, the secondary routing engine updates at least two memory buffers (e.g., receive buffer and sent buffer) within received inbound and outbound message data, respectively. The data blocks in these buffers have been written to a socket (e.g., a replication socket in accordance with TCP) that provides network communication connectivity with a particular primary routing engine. The secondary routing engine writes the data blocks as enumerated sequences in the buffers and records a sequence number of a last written block as part of the state of the backup socket. A portion of the outbound message data blocks has not yet been sent and another portion has not been acknowledged (e.g., by way of a received acknowledgement); by recording respective sequence numbers for these portions, the secondary routing engine (e.g., in a single operation) retrieve data blocks of either portion from their corresponding memory buffers.

By taking advantageous use of an eavesdropping mechanism (e.g., a hook, such as a Netfilter hook as explained herein) at both primary routing engine, the secondary routing engine is notified of up-to-date socket state changes for replication to the backup socket. In some examples, the secondary routing engine of router 6A, via the eavesdropping mechanism, listens for the inbound messages or outbound messages being received and sent at the corresponding transport protocol layer by the particular primary routing engine (e.g., at router 6A or router 6B). This layer of the protocol stack processes outbound message data after the routing protocol (e.g., application layer), and for at least that reason, the secondary routing engine may assume that the primary routing engine processed the message (e.g., and in turn, updated routing and forwarding information bases). The transport protocol of the protocol stack may be hooked to update the secondary routing engine of sent data contemporaneous to their sending. The transport layer of the protocol stack processes inbound message data after a network layer and therefore, may be hooked update the secondary routing engine with accurate and current acknowledgements. The replication module (on behalf of the secondary routing engine) generates data identifying one or more data blocks of outbound message data that are unacknowledged by the router 6C and data identifying one or more data blocks of the same outbound message data that are not yet sent to router 6C.

As described herein, the eavesdropping mechanism enables the secondary routing engine to maintain an updated socket state (e.g., a transport protocol layer state) of the backup socket in the event of a switchover such that the secondary routing engine seamlessly assumes primary role. The secondary routing engine, by way of the eavesdropping mechanism, intercepts incoming acknowledgment messages and replicates, to the state backup socket, acknowledged sequences numbers such that (with trivial latency) the socket state remains up-to-date and (mostly) current with the connected socket or the second connected socket of the primary routing engine. The secondary routing engine records a sequence number after a last acknowledged data block as a starting point of a sequence of unacknowledged data blocks. In this manner, the secondary routing engine avoids re-transmitting acknowledged data and prevents router 6A from lagging. As another advantageous use of the eavesdropping mechanism, the secondary routing engine intercepts outbound routing messages at the transport layer of the protocol stack of the primary routing engine. The secondary routing engine records a sequence number of a data block after a last sent data block by the primary routing engine. In this manner, the secondary routing engine automatically resumes routing sessions with router 6C (with zero latency) in response to a switchover and/or while the primary routing engine is down. The secondary routing engine quickly identifies each next data block to be sent to router 6C and prepares data units (e.g., packets) for communication to router 6C in continuation of the routing session with the primary routing engine.

Regardless of any switchover, data blocks storing inbound/outbound messages (e.g., routing messages) that have been processed by the transport layer of the protocol stack at the secondary routing engine and written to a corresponding send or receive buffer of the backup socket are (eventually) read by applications (e.g., an application layer). A routing protocol process at the secondary routing engine may invoke read operations requesting unread data, and in response, the replication module generates an inter-process communication with the requested data blocks. The routing protocol process updates various databases storing routing information (e.g., routing information base (RIB) and forwarding information (e.g., forwarding information base (FIB)) in preparation of the switchover such that packet forwarding engine may properly forward packets to internal destinations within the autonomous system or to external destinations in a different autonomous system.

Hence, based on the updated state information, the secondary routing engine continues routing messages for each session with router 6C without a significant interruption to packet forwarding. Even after the switchover to the backup socket of the secondary routing engine, when an inbound/outbound message is processed by a (secondary) protocol stack at router 6A, the replication module updates the data identifying one or more data blocks of the sent buffer that are unacknowledged by the router 6C and the data identifying one or more data blocks of the same sent buffer that are not yet sent to router 6C.

In other examples, the primary routing engine of router 6A may send replicated data (e.g., in an outgoing TCP segment or another data unit according to a transport layer protocol) to the secondary routing engine before that data is processed by the protocol stack (e.g., a transport layer) for the socket on the primary routing engine. For example, the replication module at the primary routing engine may replicate and communicate data to the secondary routing engine, for example, before an outbound message is packaged into a transport layer protocol data unit (when sending data) by the protocol stack (e.g., the transport layer) or before an inbound message is unpacked from a transport layer protocol data unit (when receiving data) by the protocol stack (e.g., by the transport layer). In the present disclosure, the transport layer protocol data unit may be known as a TCP segment or packet. As another example, the replication module at the primary routing engine may replicate and communicate data to the secondary routing engine after an outbound message is packaged into a data unit (e.g., a TCP segment or IP packet) by the protocol stack (e.g., the transport layer) and/or after an inbound message is unpacked by the protocol stack (e.g., the transport layer). As further illustrated below, this asymmetric/asynchronous replication of data for routing messages at different levels of the networking stack aids router 6A in ensuring that the state of the corresponding backup socket on the secondary routing engine matches that of the connected (e.g., active) socket of the primary routing engine.

In the event that the primary routing engine of router 6A goes down, for example as a result of a failure or because software of the primary routing engine is to be updated, the secondary routing engine detects the event (e.g., by way of heartbeat/keepalive signal or explicit message from the primary) and resumes control of the primary's routing functionality. Because the secondary routing engine has received all of the data that the primary routing engine has sent and received, the secondary routing engine may be able to continue the communication session without the necessity of a session restart. This data includes socket data replication (e.g., replication of inbound and outbound data) between different routing engines in a same network device or different routing engines in different network devices.

Both the primary routing engine and the secondary routing engine employ a state machine (e.g., TCP state machine) to maintain a state (e.g., TCP state) of a highly available pair of sockets and their underlying redundant connections (e.g., TCP connections) with a peer network device. For example, the secondary routing engine may keep track of sequence numbers of sent data and received data including acknowledgements for the corresponding socket. The secondary routing engine may also buffer the sent data such that, if the primary routing engine fails before at least a portion the sent data is pushed to the protocol stack and actually transmitted, the secondary routing engine may start transmitting that portion of the sent data. Starting with a first data block immediately succeeding a last sent data block that has been successfully placed on a wired/wireless connection, the secondary routing engine routes messages for the benefit of the primary routing engine's session routing messages. Furthermore, if the primary routing engine fails at a time when the sent data is not received by the peer network device recipient (as determined by whether the secondary routing engine has received an acknowledgement), the secondary routing engine may wait for the acknowledgement before and/or instead of retransmitting the data after taking control of routing duties.

The primary routing engine and/or the secondary routing engine may also map each byte of the sent data buffer to send (byte) sequence numbers (e.g., TCP send sequence numbers). By piggybacking socket replication with the TCP state of the underlying connection, the techniques described herein enable asynchronous socket data replication in a manner that may be more efficient than other socket replication techniques. For incoming data, the primary routing engine updates the TCP state in the TCP state machine for the corresponding socket as (e.g., after) the packet traverses the protocol stack, and in turn, the secondary routing engine updates the TCP state in the TCP state machine of the corresponding replicated socket. For outgoing data, the primary routing engine replicates the outgoing data to the secondary routing engine, and when an acknowledgement from a peer is received, the secondary routing engine identifies at least a portion of the outgoing data that maps to the acknowledgement and may follow that identification by removing that portion from memory. For both outgoing data and incoming data, the primary routing engine transmits, by way of an out-of-band communication (e.g., an inter-process communication (IPC) by a hooked protocol stack), current and/or updated TCP state data, upon receiving acknowledgments from the peer network device. For outgoing data, the primary routing engine replicates the sent data buffer to the secondary routing engine before pushing the send buffer through the protocol stack and then, packaging the sent data buffer as a TCP segment (or another protocol data unit). The secondary routing engine does not update the TCP state of the TCP machine until the TCP acknowledgement from the peer is received.

The primary routing engine and the secondary routing engine may maintain send and receive buffers for the out-of-band channel between the primary routing engine and the secondary routing engine. A TCP window size for the out-of-band channel represents a minimum of available buffer space on the buffers of the primary routing engine and on the buffers of the secondary routing engine. At a time when the primary routing engine receives a socket window update from the secondary routing engine, the status of the backup socket buffers may have changed, which can cause incorrect windows to be used by the primary routing engine socket. This may cause over- or under-utilization of the socket buffer size, which may cause underperformance of TCP-based socket communication.

Furthermore, the primary routing engine may be configured to replicate state information (e.g., socket data) to the secondary routing engine without relying on kernel-level enhancements, thus enabling graceful failover including socket data replication without requiring modification to an underlying kernel of an operating system of the primary routing engine. That is, the primary routing engine may be configured with a user-space replication application that intercepts socket calls, a new kernel-level module that operates separate from existing kernel software and is invoked by the replication application for replicating socket data to the secondary routing engine. When the socket layer of the operating system of the primary routing engine receives data from a peer (e.g., router 6B) or an application (e.g., a routing process), the kernel module intercepts the data and replicates this data to the secondary routing engine. After receiving an acknowledgement from the secondary routing engine, the kernel module proceeds to process the data. In general, the kernel module may include three parts: a kernel thread to process data for replication, a device driver (e.g., a Linux or Unix character driver or the like) to intercept socket data from an application (e.g., the routing process), and functionality for socket receive data event interception and event processing.

The techniques described herein may provide certain advantages. For example, router 6A may be able to perform graceful switchover between routing engines, thereby achieving non-stop routing. In the event of a failure or other need to bring down the primary routing engine, router 6A may be able to continue to forward packets without downtime and in a manner that avoid routing session reestablishment, thus avoiding route flapping by peer routers. Similarly, these techniques may enable a router to receive in-service software upgrades without causing route flapping. For example, when a software upgrade is necessary for the router, a system administrator may take the secondary routing engine offline to receive and install the upgrade.

Moreover, router 6A may perform socket replication transparently to outside network devices, such as routers 6B-6C, because no modification to existing communication protocols is necessary. Routers 6B-6C need not change their behavior with respect to the routing protocols used when communicating with peer network devices in order for router 6A to implement socket replication and non-stop routing. Moreover, routers 6B-6C need not have any indication of the fact that router 6A is configured to perform switchover.

Figure 2:
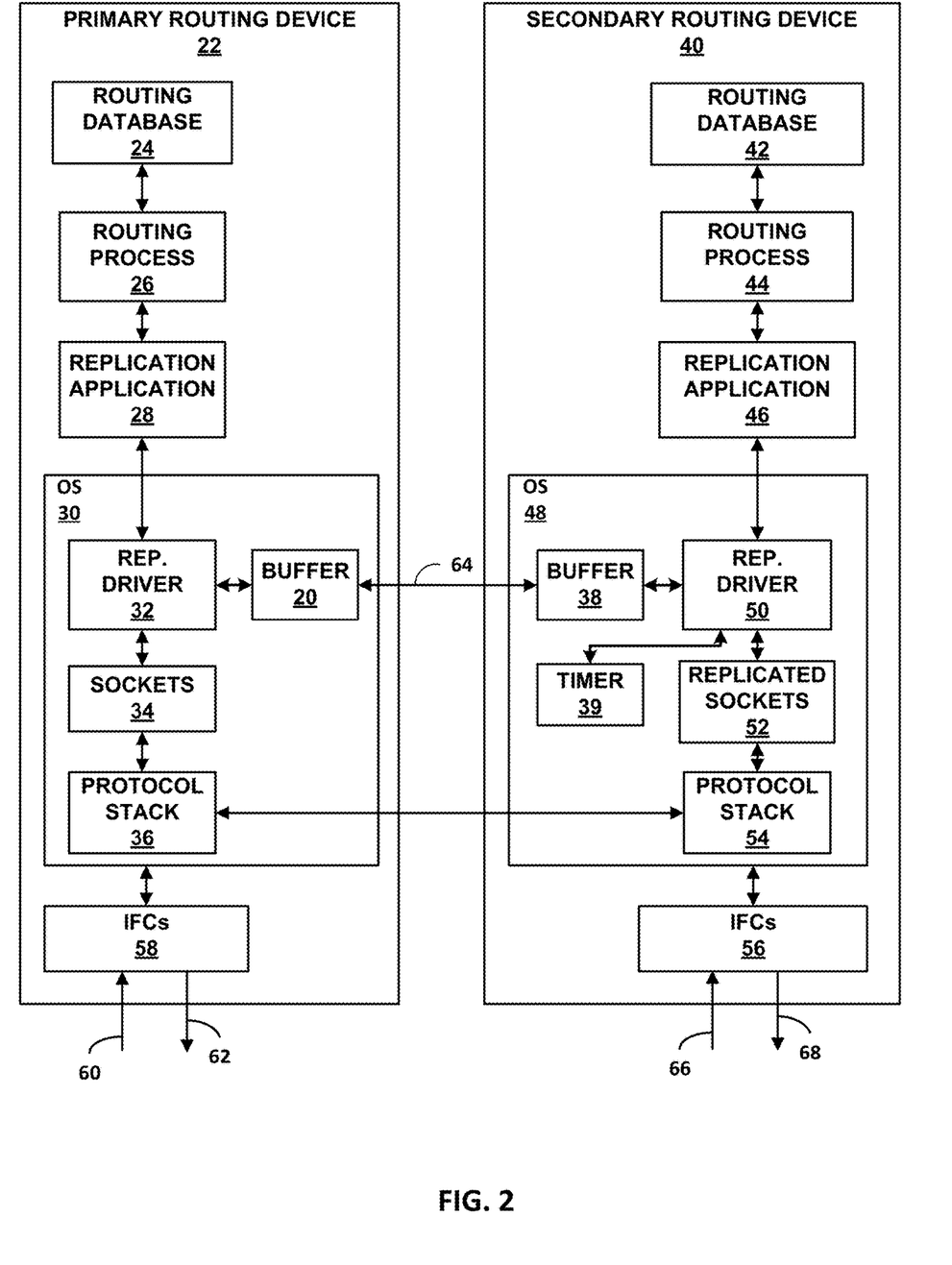
FIG. 2 is a block diagram illustrating an example router capable of performing a switchover from a primary routing engine to a secondary routing engine using the techniques of this disclosure.

FIG. 2 is a block diagram illustrating an example primary routing device 22 and secondary routing device 40 that may perform the techniques of this disclosure. Primary routing device 22 may, for example, correspond to router 6A of FIG. 1, and secondary routing device 40 may, for example, correspond to another router within AS 4A (not shown in FIG. 1). In other examples, primary routing device 22 and secondary routing device operate as primary and secondary control units, respectively, executing control-plane routing protocols within a single network node, such as router 6A of FIG. 1.

In this example, primary routing device 22 is responsible for maintaining routing database 24 to reflect the current topology of a network and other network entities to which primary routing device 22 is connected. That is, primary routing device 22 provides an operating environment for execution of a routing process (daemon) 26 that implements one or more routing protocols to communicate with peer routers and periodically update routing database 24 to accurately reflect the topology of the network and the other network entities. Example protocols include routing and label switching protocols, such as BGP, MP-BGP, IS-IS, OSPF, RIP, RSVP-TE and LDP. In a similar fashion, secondary routing device 40 provides an operating environment for maintaining routing database 42 in accordance with data received from primary routing device 22. Alternatively, the techniques described herein may be applied between a routing engine of a first router (e.g., router 6A of FIG. 1) and a routing engine of a second router (e.g., router 6B of FIG. 1). That is, a routing engine of router 6A may act as a primary routing engine, while a routing engine of a second router may act as a secondary or back-up routing engine.

In the example of FIG. 2, primary routing device 22 includes interface cards (IFCs) 58 that receive packets on inbound links 60 and sends packets on outbound links 62. Similarly, in the example of FIG. 2, secondary routing device 40 includes IFCs 56, which send data via outbound links 68 and receive data via inbound links 66 (when acting as a primary routing device). In some examples, primary routing device 22 may be a multi-chassis router in which multiple routing nodes are physically coupled and configured to operate as a single routing node. In such examples, two or more of the nodes may be configured as primary and backup/standby nodes, respectively. One example of a multi-chassis router includes multiple line card chassis (LCCs), which include one or more interface cards (IFCs) for sending and receiving packets, and a central switch control chassis (SCC), which provides top-down management of the LCCs. U.S. Pat. No. 8,050,559, issued Nov. 1, 2011, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

One or more routing protocols implemented by routing process 26 establish (peer) routing sessions with other routers and, by way of these network communication sessions, exchange routing messages. As such, an operating system (OS) 30 executing within primary routing device 22 implements kernel-level processes for handling data at various layers of the open systems interconnection (OSI) networking model (shown as protocol stack 36). OS 30 provides an API by which routing process 26 creates sockets 34 and establishes, for example, TCP/IP-based communication sessions for sending and receiving routing messages for each socket. Sockets 34 are logical constructs having data structures and state data maintained by OS 30 of primary routing device 22 and may be viewed as acting as interfaces between routing process 26 and protocol stack 36. OS 30 also provides both a kernel space for execution of OS-related processes, such as replication driver 32 and the kernel itself, and an application space for execution of applications, such as routing process 26. Replication driver 32 may be implemented as a device driver. The kernel space and application space generally correspond to separate regions of memory, e.g., random access memory (RAM), in which applications, modules, and the like are executed, and OS 30 generally prevents applications executed in the application space from accessing memory addresses assigned to the kernel space.

Primary routing device 22 also includes replication application 28. One or more processors implemented in circuitry of primary routing device 22 execute replication application 28 to perform packet and data replication between primary routing device 22 and secondary routing device 40, in accordance with the techniques of this disclosure. Replication application 28 may, for example, receive data from routing process 26 to be written to one of sockets 34. In accordance with the techniques of this disclosure, replication application 28 passes such data to replication driver 32, executed within the kernel space provided by OS 30, which replicates the data to secondary routing device 40 while writing the data to the one of sockets 34, as explained in greater detail below. In particular, OS 30 and OS 48 communicate data and acknowledgements via communication channel 64, which may correspond to a channel between sockets of OS 30 and OS 48.

Secondary routing device 40 provides an operating environment for execution of routing process 44. Like routing process 26, routing process 44 implements one or more routing protocols and periodically updates routing database 42 to accurately reflect the topology of the network and the other network entities. That is, like routing process 26, routing process 44 sends and receives routing messages through replicated sockets 52, where each of the replicated sockets corresponds to one of sockets 34 currently in use for routing communications. Routing process 44 receives replicated routing messages from primary routing device 22, updates routing database 42, and outputs routing messages as if it were handling all routing functions for primary routing device 22. Replicated sockets 52 of secondary routing device 40 are logical constructs having data structures and state data maintained by OS 48 and act as an interface between routing process 44 and protocol stack 54, also of secondary routing device 40. Like OS 30, OS 48 also provides a kernel space and an application space. One or more processors implemented in circuitry of primary routing device 22 may execute routing process 44 and replication application 46 in the application space provided by OS 48, and replication driver 50 in the kernel space provided by OS 48.

After opening a new routing session, routing process 26 interacts with operating system 30 to allocate a new socket of sockets 34 for the new routing session, and tags the socket (referred to as the "original socket") for replication by an API call to operating system 30. The call causes operating system 30 to asynchronously set up the replication communications between protocol stacks 36, 54 as described below.

When routing process 26 performs a write operation to send data to one of sockets 34, replication application 28 receives the data prior to the data reaching the one of sockets 34. Replication application 28 may then construct a write message including the data to send to replication driver 32. For example, replication application 28 may construct a message in the form of an io_buffer data structure. In general, this message may indicate that the data is to be written, and include the data to be written itself (or a pointer to a memory location at which the data is stored). Replication application 28 may then pass this message to replication driver 32.

In response to receiving this message, replication driver 32 may cause OS 30 to send data of the message (e.g., the data intended for one of sockets 34) to OS 48 for replication. In particular, in this example, primary routing device 22 maintains buffer 20 and secondary routing device 40 maintains buffer 38. Primary routing device 22 may store replicated socket data to be sent to secondary routing device 40 in buffer 20, then send the replicated socket data to secondary routing device 40. Secondary routing device 40 may receive the replicated socket data, store the received replicated socket data in buffer 38, and send a TCP acknowledgement to primary routing device 22. In particular, secondary routing device 40 may store the received replicated socket data in buffer 38 until replication driver 50 is able to read the replicated socket data from buffer 38 and update a corresponding one of replicated sockets 52 with the replicated buffer data. Thus, ultimately, replication driver 50 of OS 48 may receive the data and update the one of replicated sockets 52 corresponding to the one of sockets 34 with this received replicated socket data. In this manner, the one of replicated sockets 52 will reflect the state of the corresponding one of sockets 34.

After sending the replicated data to secondary routing device 40 and receiving the TCP acknowledgement, replication driver 32 and/or OS 30 may direct the data to the one of sockets 34. OS 30 may ultimately deliver the data from the one of sockets 34 to protocol stack 36, which encapsulates the data according to the OSI model to form a packet. OS 30 then sends the packet to one of IFCs 58 to be sent via one of outbound links 62.

Furthermore, secondary routing device 40 may read received replicated data from buffer 38 to be stored to one of replicated sockets 52, as noted above. Secondary routing device 40 may also send window update messages to primary routing device 22 indicating an available amount of space in buffer 38. As shown in the example of FIG. 2, replication driver 50 maintains timer 39. When timer 39 expires, replication driver 50 may send a window update to primary routing device 22 via communication channel 64. Alternatively, replication driver 50 may determine a threshold amount of data that can be read from buffer 38 that can immediately trigger scheduling of a window update. For example, the threshold may be twice a maximum segment size (MSS). Thus, if replication driver 50 reads at least (e.g., equal to or more than) the threshold amount of data from buffer 38 (e.g., 2×MSS), replication driver 50 may immediately schedule a window update to be sent to primary routing device 22. Thus, secondary routing device 40 may schedule the window update either upon expiration of timer 39 or after replication driver 50 reads at least the threshold amount of data from buffer 38.

Replication driver 32 of primary routing device 22 may maintain an estimate of an available amount of space in buffer 38 for one of replicated sockets 52. For example, an amount of available space in buffer 38 indicated in a window update message from secondary routing device 40 will not reflect additional data that has already been sent from primary routing device 22 to secondary routing device 40 and/or data to be sent from secondary routing device 40 and currently queued in buffer 38.

Accordingly, replication driver 32 may map bytes of replicated data with TCP sequence numbers for the connection on communication channel 64 in both directions. For example, if ten bytes of send data are to be replicated, replication driver 32 may map the data block with the write TCP sequence of the primary socket of sockets 34.

Thus, a write sequence of the primary socket may be mapped with an end sequence of the data block. The end sequence of the write side replicated data block indicates that the write sequence number that has been sent to secondary routing device 40 but not yet acknowledged. Replication driver 32 may send a start sequence of the data block along with the data. Replication driver 50 may mark the end sequence of this data block as a last received send sequence number from primary routing device 22. When this data block has been written over communication channel 64, it means that this data block has either reached secondary routing device 40 or is still in flight.

Replication driver 32 accounts for this space in buffer 38 to reflect ten bytes (in this example). Replication driver 32 may thus decrement a value representing the amount of data in buffer 38 by ten. When this data block is processed replication driver 50, replication driver 50 may update the end send/write sequence number after queuing data on a send buffer (e.g., buffer 38). When primary routing device 22 replicates a next data block, replication driver 32 checks the value representing the space available in buffer 38 (which was already decremented by ten, i.e., the length of the send data last replicated). If the value representing the amount of data available in buffer 38 indicates that this next replicated data block can be stored in buffer 38, replication driver 32 may send the data block. Otherwise, replication driver 32 may wait until a next window update is received from secondary routing device 40. If replication driver 32 is able to send the data block, replication driver 32 may further update the value representing the amount of data available in buffer 38.

When replication application 46 issues a read request from replication driver 50, replication driver 50 may read data from buffer 38 and determine whether more than a threshold amount of data has been created in buffer 38. In particular, after data has been read from buffer 38, that data may be cleared from buffer 38. In some examples, the threshold may be equal to one MSS. In some examples, the threshold may be equal to 2*MSS. If more than the threshold amount of data has been cleared in buffer 38, replication driver 50 (or OS 48) may immediately schedule a window update to be sent to primary routing device 22 for a corresponding one of replicated sockets 52. The window update may include data representing a latest send sequence number received from primary routing device 22 and a number of bytes queued in buffer 38 to be sent to primary routing device 22. If the window update was already scheduled due to expiration of timer 39 but data for the window update was not yet sent, replication driver 50 may update the data of the window update as discussed above and then send the window update at the previously scheduled time.

When replication driver 32 receives a window update from secondary routing device 40, replication driver 32 may determine two parameters: a length of send data in flight along communication channel 64 and a length of data queued in buffer 38. Replication driver 32 may compute the length of the send data in flight as a difference between a write sequence on primary routing device 22 and the write sequence value received in the window update. Replication driver 32 may determine the length of data queued in buffer 38 from the window update itself. Replication driver 32 may determine an amount of send buffer space as a sum of a length of the replication send snoop data in flight and a length of data queued in the send queue of buffer 38. Replication driver 32 may determine an amount of data on a receive queue side in a similar manner.

Primary routing device 22 may also receive a packet via one of inbound links 60. The one of IFCs 58 that receives the packet may send the packet to protocol stack 36 of primary routing device 22. Protocol stack 36 may decapsulate the packet to extract application-layer data associated with an application, such as a routing instance of routing process 26. In accordance with the techniques of this disclosure, OS 30 may maintain a data structure (not shown) representative of applications for which data is to be replicated. Accordingly, OS 30 may determine whether the application-layer data is to be replicated to secondary routing device 40 based on the application to which the application-layer data is to be delivered and the data structure.

If the application-layer data is to be replicated, OS 30 may deliver the application-layer data to replication driver 32. Replication driver 32 may again form a data structure including and/or representative of the application-layer data and send this data structure (e.g., the io_buffer data structure discussed in greater detail below) to OS 48. After OS 48 and/or replication driver 50 updates a corresponding one of replicated sockets 52, OS 48 may send an acknowledgement of the replicated data to OS 30.

OS 30 may receive a read request from routing process 26 to read data from the one of sockets 34 to which the received application-layer data is to be written. Replication driver 32 and/or OS 30 may wait until after the acknowledgement is received from OS 48/replication driver 50 before delivering data of the one of sockets 34 to routing process 26 in response to the read request.

In this manner, primary routing device 22 may perform a socket replication process between sockets 34 and replicated sockets 52 of primary routing device 22 and secondary routing device 40, respectively. In particular, this socket replication process does not need to involve alteration of a kernel of OS 30 or a kernel of OS 48. Thus, the techniques of this disclosure may be implemented in a router for which OSs 30, 48 are closed source or for which licensures prevent kernel alteration. That is, because the techniques of this disclosure can be performed, at least in part, by replication drivers 32, 50 (implemented as device drivers in this example), replication drivers 32, 50 have access to kernel-level resources, without modifying the kernel itself.

Figure 3:
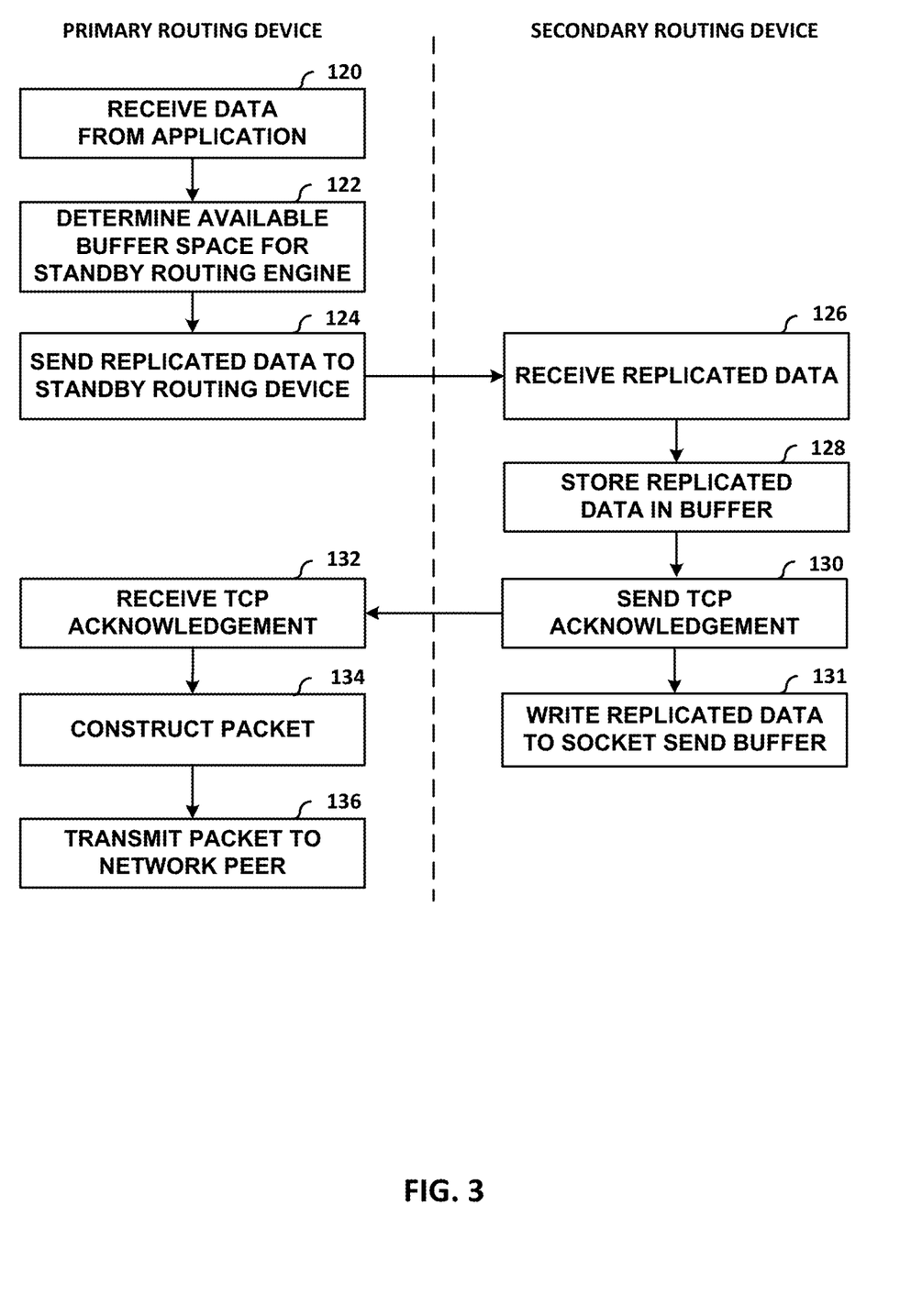
FIG. 3 is a flowchart illustrating an example method according to the techniques of this disclosure.

FIG. 3 is a flowchart illustrating an example method according to the techniques of this disclosure. In this example, initially, replication driver 32 of primary routing device 22 receives data from replication application 28 (120). Replication driver 32 then determines an available amount of buffer space for buffer 38 of secondary routing device 40 (i.e., a standby routing device) (122). Assuming there is sufficient space in buffer 38 of secondary routing device 40, replication driver 32 sends the replicated data to secondary routing device 40 (124).

Secondary routing device 40 receives the replicated data (126) and stores the replicated data in buffer 38 (128). Secondary routing device 40 also sends a TCP acknowledgement (130) for the received replicated data. Primary routing device 22 and secondary routing device 40 each write the data to respective sockets, where secondary routing device 40 writes the data to a replicated socket send buffer (131).

After primary routing device 22 receives the TCP acknowledgement (132), primary routing device 22 constructs a packet using the data (134) and transmits the packet to the network peer (136).

Figure 4A:
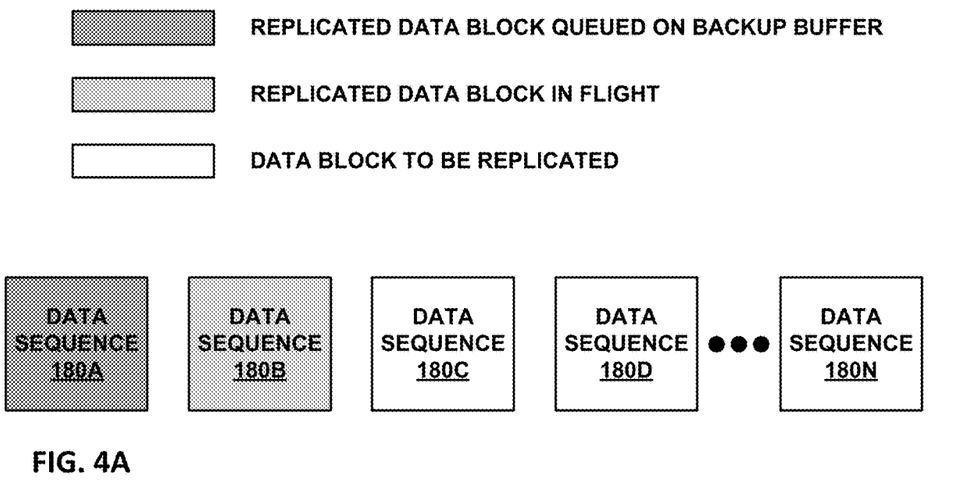
FIGS. 4A and 4B are conceptual diagrams illustrating examples of data sequences of bytes of replicated data.
Figure 4B:
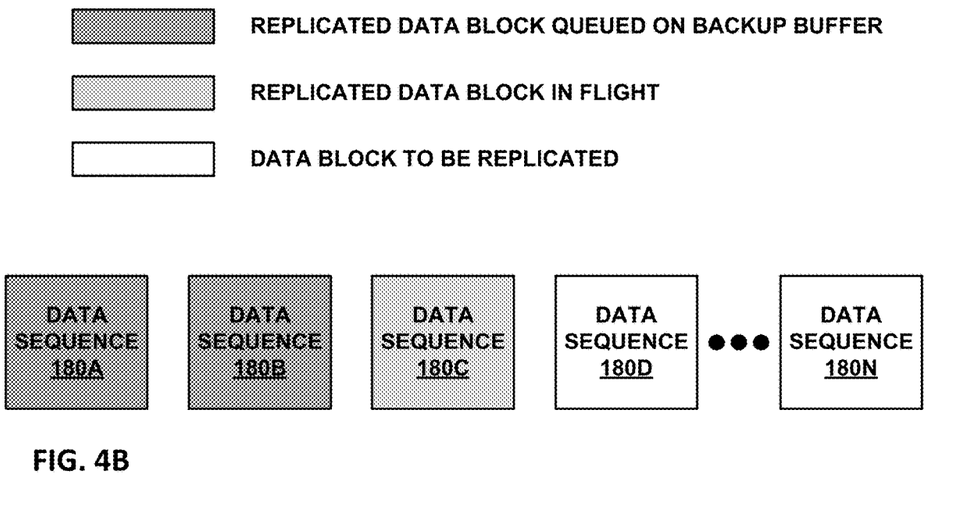

FIGS. 4A and 4B are conceptual diagrams illustrating examples of sequences 180A-180N (sequences 180) representing sequences of bytes of replicated data. In both FIGS. 4A and 4B, dark grey blocks represent replicated data blocks queued on a backup buffer (e.g., buffer 38 of FIG. 2), light grey blocks represent data blocks in flight across communication channel 64 (FIG. 2), and white blocks represent data blocks that are yet to be replicated.

In the example of FIG. 4A, data sequence 180A is dark grey, indicating that data sequence 180A includes blocks of replicated data that are currently stored in buffer 38. When replication driver 50 of FIG. 2 reads this block of data, replication driver 50 may determine that a threshold amount of data has been read from buffer 38. Thus, replication driver 50 may schedule a window update. The window update may include data indicating that a last data block in data sequence 180A has been read. Thus, an amount of data in buffer 38 may be decremented by the amount of data included in data sequence 180A. However, because data sequence 180B is in flight from primary routing device 22 to secondary routing device 40, the view of buffer 38 maintained by replication driver 32 is that buffer 38 is to be decremented by the size of data sequence 180B and that buffer 38 may be incremented by the size of data sequence 180A (in response to the window update).

In the example of FIG. 4B, it is assumed that both data sequence 180A and data sequence 180B have not yet been read and are currently queued in buffer 38. Likewise, data for data sequence 180C is currently in flight. Timer 39 maintained by secondary routing device 40 may expire, triggering scheduling of a window update. The window update may indicate that data for both data sequence 180A and data sequence 180B is currently in buffer 38. Replication driver 32 may further determine, using the window update, that an amount of space available in buffer 38 must further be decremented by the size of data sequence 180C, because data sequence 180C is currently in flight toward secondary routing device 40.

Figure 5:
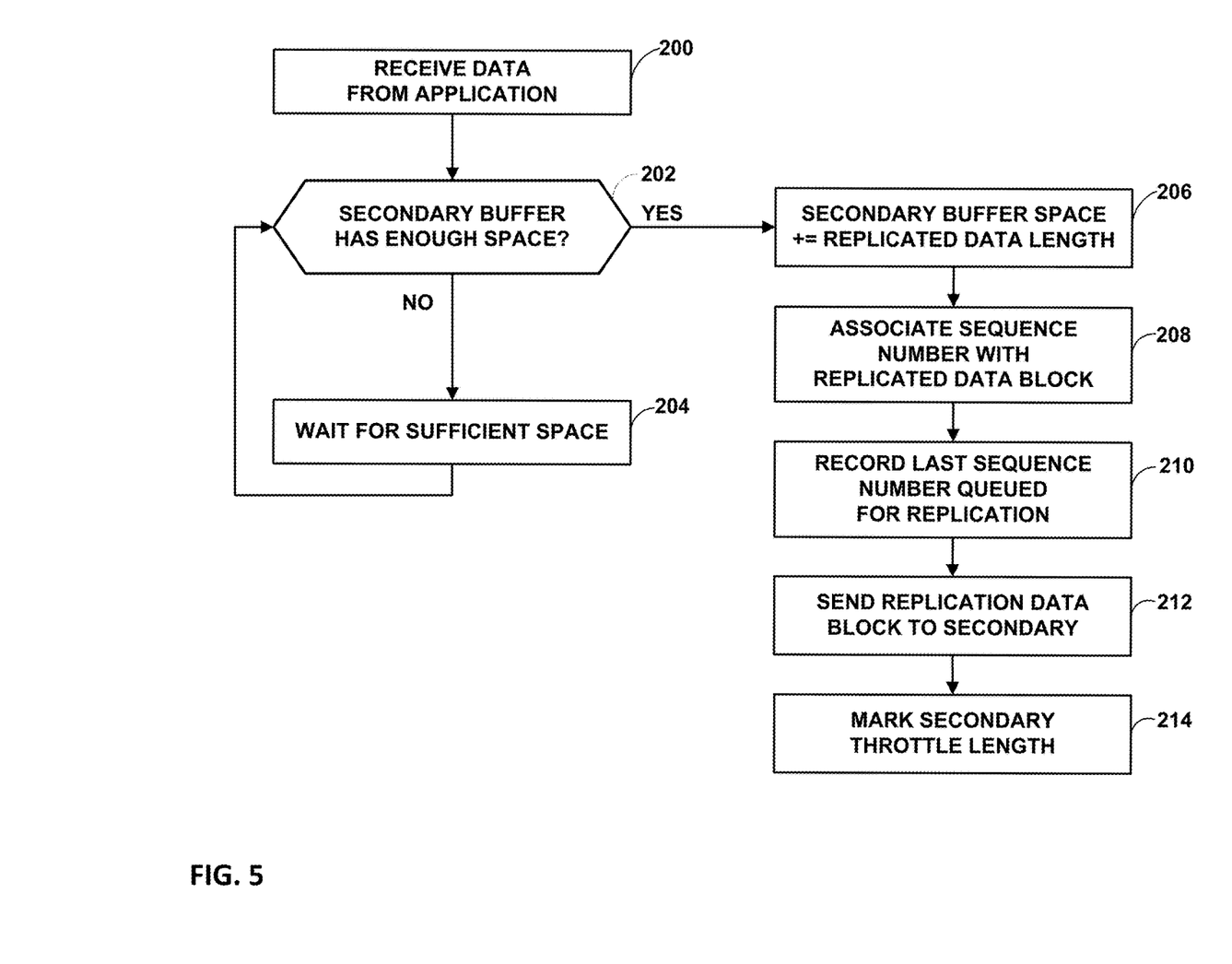
FIG. 5 is a flowchart illustrating an example method for tracking, by a replication driver of a primary routing device, an amount of space available in a buffer of a secondary routing device according to the techniques of this disclosure.

FIG. 5 is a flowchart illustrating an example method for tracking, by replication driver 32 of primary routing device 22, an amount of space available in buffer 38 of secondary routing device 40 according to the techniques of this disclosure. Initially, replication driver 32 receives data from replication application 28 (200). Replication driver 32 determines whether buffer 38 of secondary routing device 40 has enough space for the received data (202). If buffer 38 does not have enough space ("NO" branch of 202), replication driver 32 waits until sufficient space is available in buffer 38 (e.g., as indicated by a window update message from secondary routing device 40).

On the other hand, if there is sufficient space in buffer 38 ("YES" branch of 202), replication driver 32 may increment a value representing an amount of space consumed in buffer 38 by the replicated data length (206). Replication driver 32 may also associate a sequence number with the replicated data block (208). Replication driver 32 may record a last sequence number queued for replication (210) (e.g., pri sequence last replicated). Replication driver 32 may then send the replication data block to secondary routing device 40 (212) and mark a secondary throttle length (214).

Figure 6:
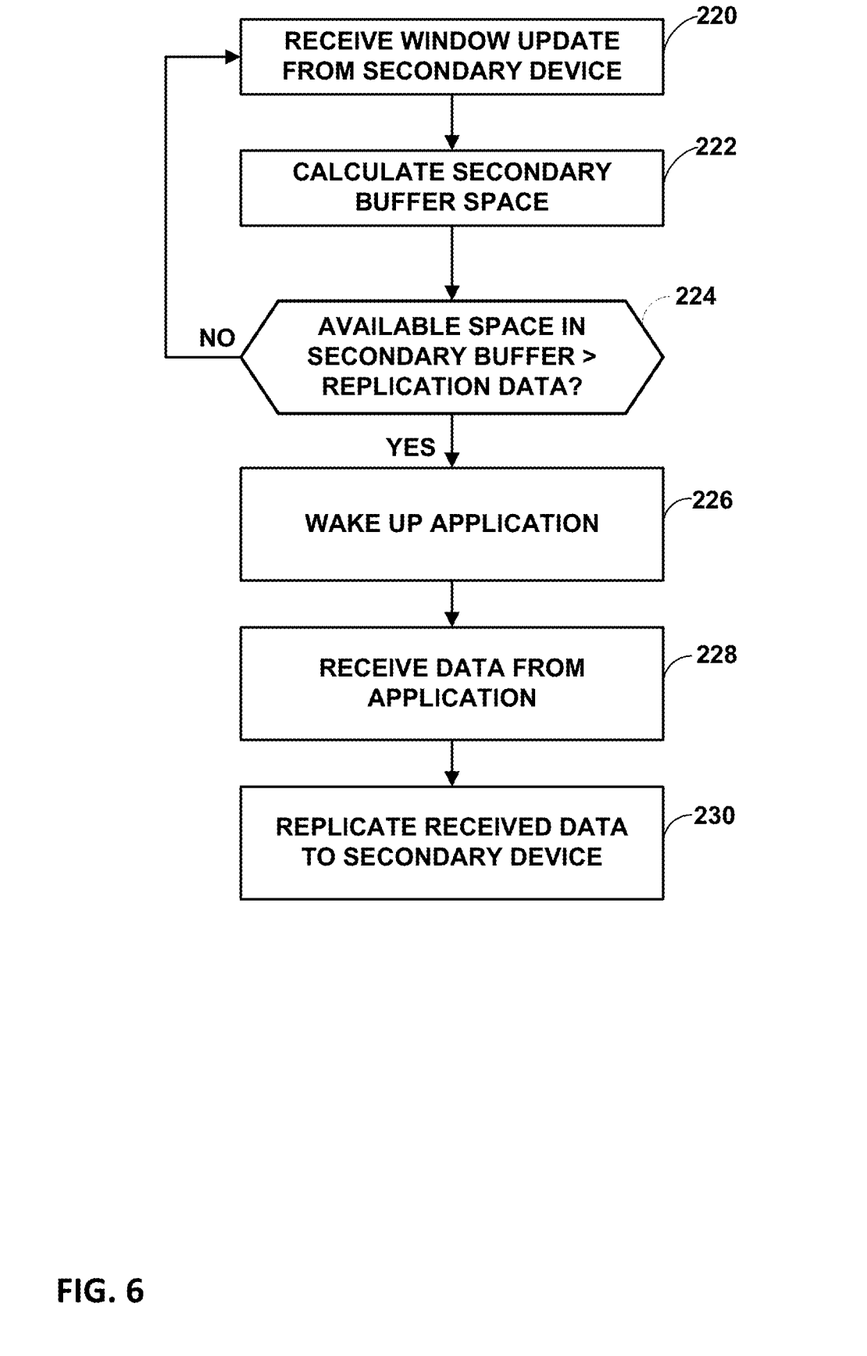
FIG. 6 is a flowchart illustrating an example method for throttling sending of replicated data from a primary routing device to a secondary routing device according to the techniques of this disclosure.

FIG. 6 is a flowchart illustrating an example method for throttling sending of replicated data from primary routing device 22 to secondary routing device 40 according to the techniques of this disclosure. The method of FIG. 6 may be performed as part of step 204 of FIG. 5. In this example, replication driver 32 receives a window update from secondary routing device 40 (220). Replication driver 32 then calculates an amount of buffer space for buffer 38 of secondary routing device 40 (222). Replication driver 32 may then determine whether the available space in buffer 38 exceeds an amount of data to be replicated (224). If not ("NO" branch of 224), replication driver 32 may again await a window update message from secondary routing device 40.

Otherwise ("YES" branch of 224), replication driver 32 may wake replication application 28 (226), receive data to be replicated from replication application 28 (228), and replicate the received data to secondary routing device 40 (230).

Figure 7:
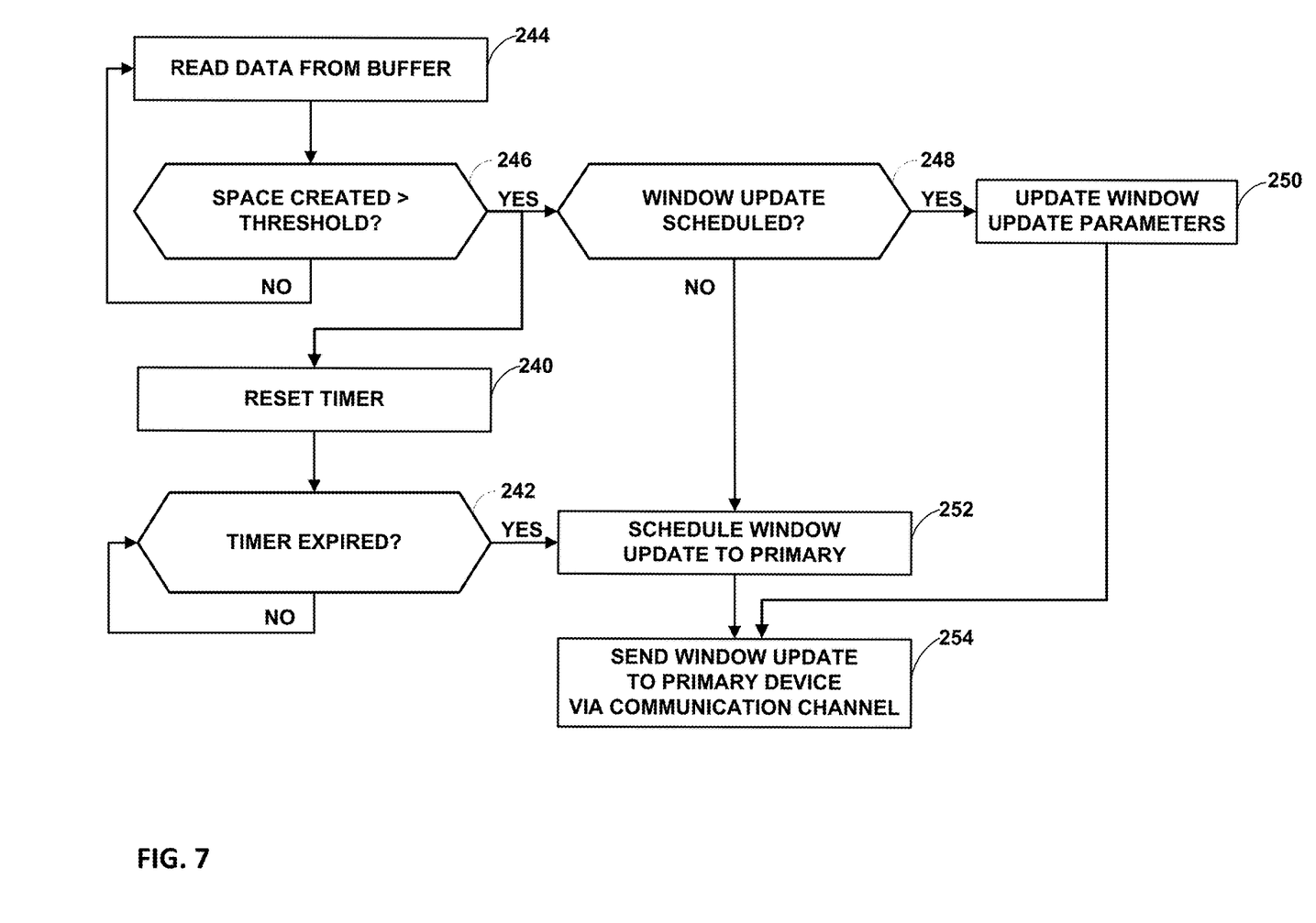
FIG. 7 is a flowchart illustrating an example method for scheduling a window update from a secondary routing device to a primary routing device.

FIG. 7 is a flowchart illustrating an example method for scheduling a window update from secondary routing device 40 to primary routing device 22. Initially, replication driver of secondary routing device 40 may start/reset timer 39 (248). Replication driver 50 may also determine whether timer 39 has expired (242). If timer 39 has not expired ("NO" branch of 242), replication driver 50 may wait for timer 39 to expire. If timer 39 expires ("YES" branch of 242), replication driver 50 may schedule a window update to primary routing device 22 (252). The window update may include data representing, e.g., a last sequence number received and a queued data length in buffer 38.

Meanwhile, replication driver 50 may read data from buffer 38 (244). Replication driver 50 may then determine whether an amount of space created in buffer 38 exceeds (or is equal to) a threshold value (246). As noted above, the threshold may be, e.g., the MSS or 2*MS S, in some examples. If the amount of data read from buffer 38 does not exceed the threshold ("NO" branch of 246), replication driver 50 may continue to read data from buffer 38 (244). However, if the space created in buffer 38 exceeds the threshold ("YES" branch of 246), replication driver 50 may determine whether a window update has already been scheduled (e.g., as a result of expiration of timer 39) (248). If the window update has not already been scheduled ("NO" branch of 248), replication driver 50 may schedule the window update (252), including data representing, e.g., a last sequence number received and a queued data length in buffer 38. In addition, replication driver 50 may reset timer 39 (240).

On the other hand, if the window update was already scheduled ("YES" branch of 248) but has not yet been sent, replication driver 50 may update the parameters of the window update to reflect the amount of data read from buffer 38 (250). In either case, replication driver 50 may send the window update to primary routing device 22 via communication channel 64 (254). Thus, secondary routing device 40 may schedule a window update either in response to expiration of timer 39 or in response to reading an amount of data from buffer 38 equaling or exceeding a threshold, e.g., MSS, 2*MSS, or some other threshold value.

In this manner, the method of FIG. 7 represents an example of a method including determining, by a standby driver executed by a processor implemented in circuitry of a standby routing device, a threshold value, the standby routing device acting as a backup routing device for a primary routing device; determining, by the standby driver, that an amount of data equaling or exceeding the threshold value has been read from a transmission buffer of the standby routing device, the transmission buffer storing data transmitted between the primary routing device and the standby routing device; in response to determining that the amount of data equaling or exceeding the threshold value has been read from the transmission buffer, scheduling, by the standby driver, a window update for the transmission buffer at a scheduled time; and sending, by the standby driver, the window update at the scheduled time.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A system comprising:
  a processing system comprising one or more processors implemented in circuitry, the processing system being configured to execute a replication driver of a backup router, the backup router providing backup to a primary router; and
  a memory configured to include a transmission buffer, the transmission buffer storing replicated socket data transmitted between the primary router and the backup router,
  wherein the one or more processors are configured to execute the replication driver to:
    determine a threshold value;
    determine that an amount of data equaling or exceeding the threshold value has been read from the transmission buffer;
    in response to determining that the amount of data equaling or exceeding the threshold value has been read from the transmission buffer, schedule a window update for the transmission buffer at a scheduled time; and
    send the window update at the scheduled time.

2. The system of claim 1, wherein the processing system is configured to determine the threshold value according to a maximum segment size (MSS).

3. The system of claim 2, wherein the threshold value comprises the MSS.

4. The system of claim 2, wherein the threshold value comprises two times the MSS.

5. The system of claim 1, wherein the processing system is further configured to form the window update to include data representing a last sequence number received from the primary routing device and read from the buffer and an amount of data queued in the transmission buffer.

6. The system of claim 1, wherein the processing system is further configured to track a window update timer, the window update timer representing a time at which to schedule a window update, wherein the processing system is configured to schedule the window update in response to determining that the amount of data equaling or exceeding the threshold value has been read from the transmission buffer and prior to expiration of the window update timer.

7. The system of claim 1, wherein the processing system is further configured to reset the window update timer after scheduling the window update.

* * * * *